(12) United States Patent
Tague et al.

(10) Patent No.: US 10,212,241 B2
(45) Date of Patent: Feb. 19, 2019

(54) NETWORK SERVICE COMPARATIVE USER INTERACTION ADJUSTER

(71) Applicant: Microsoft Technology Licensing, LLC, Redmond, WA (US)

(72) Inventors: Matthew Steven Tague, San Mateo, CA (US); Saghar Boukani, Berkeley, CA (US); Alvin Kan, Singapore (SG); Nicholas Paul Carroll, Singapore (SG); Michael Mario Jennings, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 15/269,153

(22) Filed: Sep. 19, 2016

(65) Prior Publication Data
US 2018/0084066 A1    Mar. 22, 2018

(51) Int. Cl.
| G06F 15/173 | (2006.01) |
| H04L 29/08 | (2006.01) |
| H04L 12/26 | (2006.01) |
| G06F 17/30 | (2006.01) |

(52) U.S. Cl.
CPC .......... *H04L 67/22* (2013.01); *G06F 17/3089* (2013.01); *G06F 17/30867* (2013.01); *G06F 17/30994* (2013.01); *H04L 43/08* (2013.01); *H04L 67/306* (2013.01)

(58) Field of Classification Search
CPC ....... H04L 67/22; H04L 43/28; H04L 67/306; G06F 17/30867; G06F 17/3089; G06F 17/30994
USPC ......................................................... 709/224
See application file for complete search history.

(56) References Cited

U.S. PATENT DOCUMENTS

| 2001/0034011 A1* | 10/2001 | Bouchard | G06Q 10/10 434/236 |
| 2006/0184464 A1* | 8/2006 | Tseng | G06F 17/30616 706/14 |
| 2010/0042577 A1* | 2/2010 | Rinearson | G06Q 10/10 706/56 |
| 2014/0101085 A1* | 4/2014 | Lu | G06N 5/02 706/46 |
| 2015/0269508 A1* | 9/2015 | Damboritz | G06Q 10/06311 705/2 |
| 2016/0092822 A1* | 3/2016 | Lavoie | G06Q 10/06398 705/7.42 |

* cited by examiner

*Primary Examiner* — Umar Cheema
*Assistant Examiner* — Hannah S Wang
(74) *Attorney, Agent, or Firm* — Schwegman Lundberg & Woessner, P.A.

(57) ABSTRACT

A system and method for analyzing network service usage is provided. In example embodiments, model users of the network service are identified using a number of target events and in-scope events. Users of the network service generate interaction data by interacting with the network service. The interaction data of the identified model users can be compared to the interaction data of the non-model users without exposing the interaction data.

18 Claims, 8 Drawing Sheets

NETWORK SERVICE COMPARATIVE USER INTERACTION ADJUSTER

TECHNICAL FIELD

Embodiments of the present disclosure relate generally to analyzing network services and, more particularly, but not by way of limitation, to network service use analysis.

BACKGROUND

In recent years, many locally-run applications have been reconfigured as network services (e.g., cloud services). While network services allow developers to easily fix, update, and distribute different applications, gauging how effectively users are using the network service remains a difficult problem because user data is often kept private and confidential for security and privacy reasons. As is evident, there is a demand for improved approaches for network service use analysis.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments a system and method for comparatively measuring interaction with a network service is provided. An example network service is a recruiter tool of a social network that allows recruiters to search for job candidates, contact candidates, and communicate with candidates about changing jobs. Determining whether a user is effectively using a network service is a difficult task because network services can offer a plethora of different functionalities, including, for example: search engine functionality, accounting functionalities, creating job listing functionalities, social network platform functionalities, electronic mail (e-mail) functionalities, search engine functionalities, time tracking functionalities, and many other functionalities. The use of these network service functionalities may not be readily quantifiable as efficient or inefficient, useful or not useful, successful or not successful. For example, if the network service is a search engine to find job candidates, how does a manager determine who is performing the best searches? How does a manger qualify what is a "good" search versus a "best" search. How does that manager qualify which of his employees are using a pay-per-search search engine efficiently?

Even assuming a manager can identify one or more users that are most efficiently using a network service, sharing how the efficient users are using the network service may not be possible because user interactions with the network service are stored on the backend, not accessible to the public, often confidential, and often not accessible to a manager. Providing access to user interaction data may breach privacy laws and create large network security holes, which malicious entities (e.g., hackers) can exploit.

According to some example embodiments, a comparative interaction adjuster system is implemented to solve the network service problem of identifying the best users of a given network service, comparing other users against the best users, while keeping user interaction data secure and confidential. The comparative interaction adjuster system first identifies the best performing users of the network service and flags those users as model users of the system. The model users generate interaction data by interacting with the network service under analysis. The interaction data generated by the model users can be grouped into categories by an administrator or machine learning. The categories are used to identify related interactions with the network provider. For example, one type of category may describe how complete a user's profile is on a network platform related to the network service. Another example type of category can describe how often and effectively a user communicates to other users through the network service, for example, through posts, e-mails, or social network interactions (e.g., likes or dislikes of another user's post, shares of a another user's post, etc.).

Once the interaction data of the model users is stored, the interaction data for the other users (e.g., users not flagged as model users) is analyzed. In some example embodiments, the interaction data from the other users is compared by category to the model user interaction data to determine a similarity between the sets of interaction data. For example, a model user may perform 140 searches per month using the network service. Because the model user has been flagged as a model (e.g., expert) user, 140 searches per month may be assigned as efficient or good use of the network service. An example non-expert user may be performing 15 searches per month. The difference between the searches per month can be stored as a categorical interaction metric for the other user (e.g., non-model user).

Once each of the categories is analyzed for the other user, an interaction index per user can be created by adding the user's categorical interaction metrics together. For example, if a user received 34 in a first category, 10 in a second category, 4 in third category, and 30 in fourth category, the interaction index for that user is then 78. An interaction index allows users of the network service to be compared against one another even when the interaction data for the users is confidential or not-accessible.

If a user is scoring low in a given category, for example lower than a pre-configured threshold, one or more suggested user interactions can be retrieved from an interaction library and transmitted to the user. The user can create further interaction data with the network service by performing the suggested operations.

Figure 1:
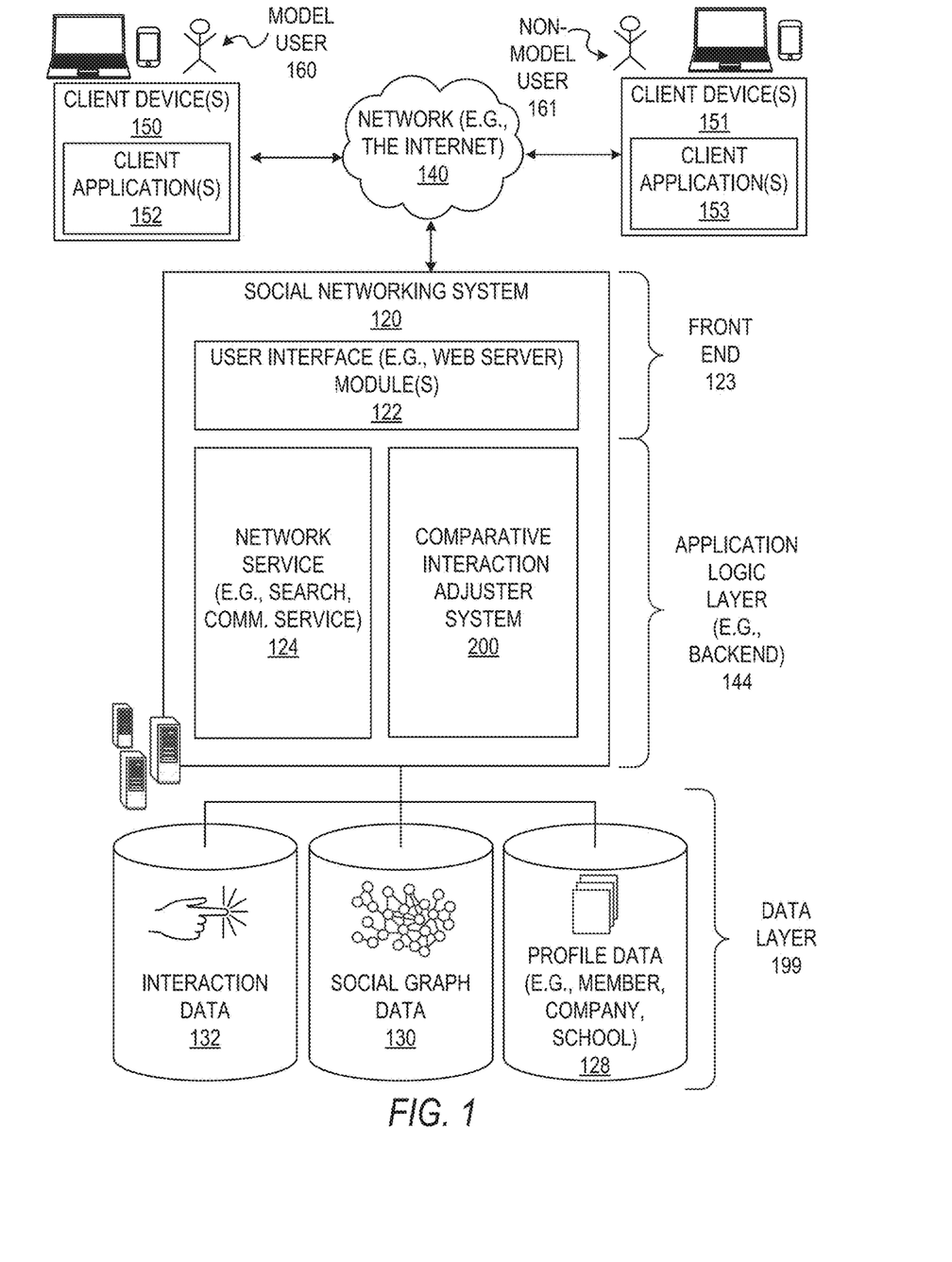
FIG. 1 is a network diagram depicting a client-server system of a network service and comparative interaction adjuster system, according to some example embodiments.

As shown in FIG. 1, a social networking system 120 is generally based on a three-tiered architecture, consisting of a front-end layer 123, application logic layer 144, and data layer 199. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including, for example, client device 150 and client device 151. For example, the user interface module(s) 122 may receive requests in the form of Hypertext Transport Protocol (HTTP) requests, or other web-based, Application Programming Interface (API) requests. The client devices 150 and 151 may be executing conventional web browser applications and/or applications (also referred to as "apps") that have been developed for a specific platform to include any of a wide variety of mobile computing devices and mobile-specific operating systems (e.g., iOS™, Android™, Windows® Phone). For example, client devices 150 and 151 may be executing client applications 152 and 153, respectively. The client applications 152 and 153 may provide functionality to present information to the user and communicate via the network 140 to exchange information with the social networking system 120. Each of the client devices 150 and 151 may comprise a computing device that includes at least a display and communication capabilities with the network 140 to access the social networking system 120. The client devices 150 and 151 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users may include a person, a machine, or other means of interacting with the client devices. For example, as illustrated, a model user may interact with the social networking system 120 through client device 150 and a user 161 may interact with the social networking system 120 through client device 151. The users 160 and 161 may not be part of the networked environment, but may be associated with client devices 150 and 151, respectively. In the example illustrated in FIG. 1, user 160 is a model user that is identified using the comparative interaction adjuster system 200. The model user 160 uses client device 150 to produce interaction data by interacting with network service 124. The interaction data is stored in database 132. Similarly, user 161 is a non-model user in that he/she was not identified as a model user by the interaction adjuster system, as described in further detail below. The non-model user 161 produces interaction data by interacting with the network service 124. Once the interaction data from the model user and the non-model user are generated, the comparative interaction adjuster system 200 can compare sets of data to provide categorical interaction metrics for the non-model user without exposing the interaction data of the model user 160, which may be private and confidential. Though one model user 160 is illustrated in FIG. 1, it is appreciated that many model users in different organizations (e.g., different companies, countries) may be identified and used for comparison against the non-model users. In this way, e.g., by comparing interaction data from non-model users to interaction data of model users across different companies, managers and non-model users that pay for access to the network service 124 can gain valuable insight as to how they are utilizing the network service 124 that has not been conventionally available because different organizations keep their cloud data (e.g., interaction data) private and confidential. Further, according to some example embodiments, all the model users may come from the same organization so as to allow a manager to analyze how his/her employees are using the network service 124.

As shown in FIG. 1, the data layer includes several databases, including a database 128 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 120, information relating to the members' activity and behavior (e.g., interaction data) may be stored in a database, such as the database 132. The interaction data stored in database 132 may include data describing interactions with network service 124, according to an example embodiment.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer 144 includes network service 124, which, in conjunction with the user interface module(s) 122, generates various user interfaces with data retrieved from various data sources or data services in the data layer 199. With some embodiments, network service 124 is used to implement the various functionalities associated with various applications, services and features of the social networking system 120. For instance, a messaging application, such as an email application, an instant messaging application, or some hybrid or variation of the two, may be implemented by the network service 124. Similarly, a search engine enabling users to search for and browse member profiles may be implemented by network service 124. As illustrated in FIG. 1, social networking system 120 may include an comparative interaction adjuster system 200, which is described in more detail below.

Figure 2:
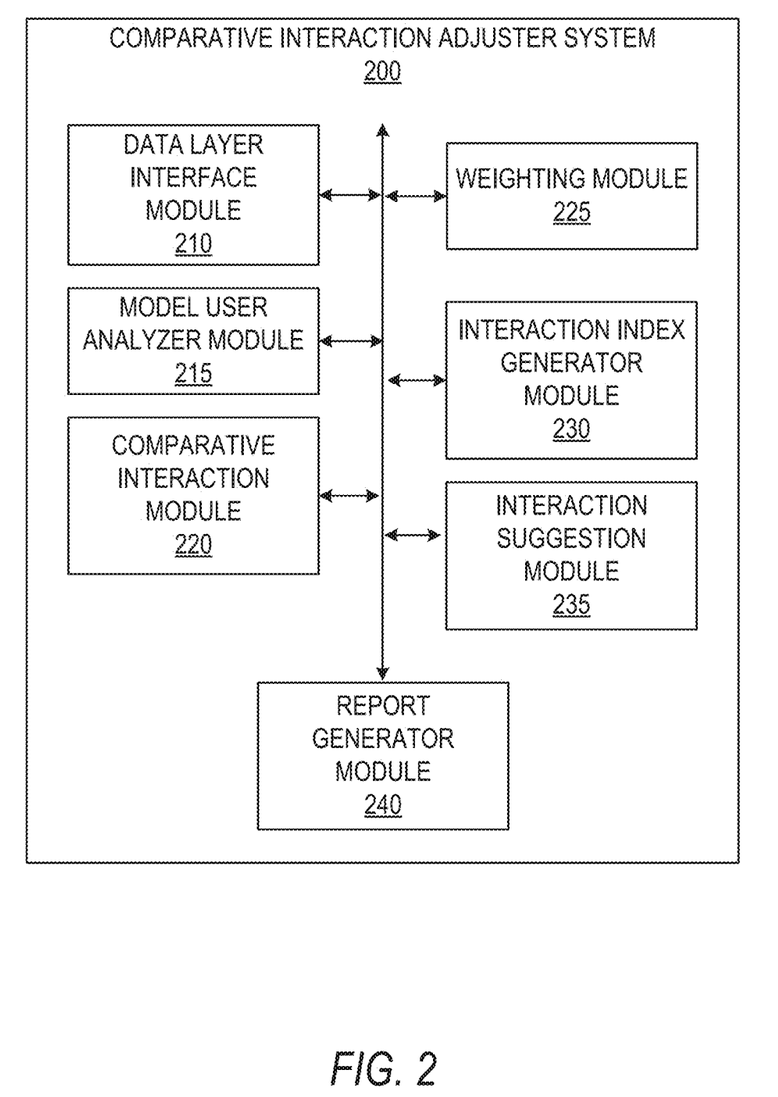
FIG. 2 is a block diagram illustrating an example embodiment of a comparative interaction adjuster system, according to some example embodiments.

FIG. 2 illustrates a block diagram showing components in the comparative interaction adjuster system 200, according to some example embodiments. The components themselves are communicatively coupled (e.g., via appropriate interfaces) to each other and to various data sources, so as to allow information to be passed between the applications or so as to allow the applications to share and access common data. Furthermore, the components access one or more databases (e.g., database 128, database 130, database 132). To this end, the comparative interaction adjuster system 200 includes a data layer interface 210, a model user analyzer module 215, a comparative interaction module 220, a weighting module 225, an interaction index generator 230, an interaction suggestion engine 235, and a report generator module 240, as according to an example embodiment.

The data layer interface 210 is configured to access the different databases in the data layer 199, as according to some example embodiments. In particular, the data layer interface 210 accesses interaction data from database 132 to identify model (e.g., expert) users, and then later accesses interaction data from database 132 to determine categorical interaction metrics for the plurality of other users. The model user analyzer module 215 is responsible for analyzing interaction data from database 132 and user profile data from database 128 to identify and flag a portion of the plurality of users as model users (e.g., expert users). The model user analyzer module 215 is further discussed with reference to FIG. 3. The comparative interaction module 220 is configured to compare interaction data of the other users of the network service 124 against the interaction data generated by the identified model users to generate categorical interaction metrics for the other users of the network service. The weighting module 225 weights the categorical interaction metrics according to manually assigned weights or machine learning generated weights. The interaction index generator 230 is configured to generate an interaction metric for each of the other users of the network service. The interaction metric measures the performance of a given other user against the identified model users. By using the interaction metric to gauge a users performance, the interaction data is kept confidential and restricted from the plurality of users through the front-end layer 123, which is public facing, while still allowing the plurality of users to analyze their performance of the network service through the front-end layer 123.

The interaction suggestion engine 235 is configured to analyze the user categorical interaction metric for a user to determine whether a category threshold is not met. If the category threshold is not met, the interaction suggestion engine 235 retrieves suggested interactions from an interaction library and transmits them to the report generator module for inclusion in a report interface for a user. The suggested interactions are suggestions for how a user can improve his/her score through specific recordable interactions with the network service. In some embodiments, the suggested interactions do not directly correspond to the interactions analyzed by the comparative interaction module 220. For example, the user interaction metrics module may analyze the number of searches performed by a user on the network service and the amount of time the user is logged into the network service to generate a category score. If the user scores low in the category, the interaction suggestion engine 235 may suggest that the user perform more searches, but not necessarily suggest that the user stay logged in the network service for longer periods of time. This prevents a user from "gaming" the system (exploiting a design weakness of the comparative interaction adjuster system 200) by simply staying logged-in to the network service to boost their category score.

The report generator module 240 receives data from other modules of the comparative interaction adjuster system 200 and generates a report interface for display on a display device of a client device (e.g., client device 151). The report interface may include the categorical interaction data metrics, visualizations of the categorical interaction metrics, the index, and suggested interactions. By analyzing the data in the report interface, users of the network service can compare themselves to other users of the network service, who may be in another company or other country while keeping the interaction data of all the users of the network service secure and confidential on the backend of the social network system 120.

Figure 3:
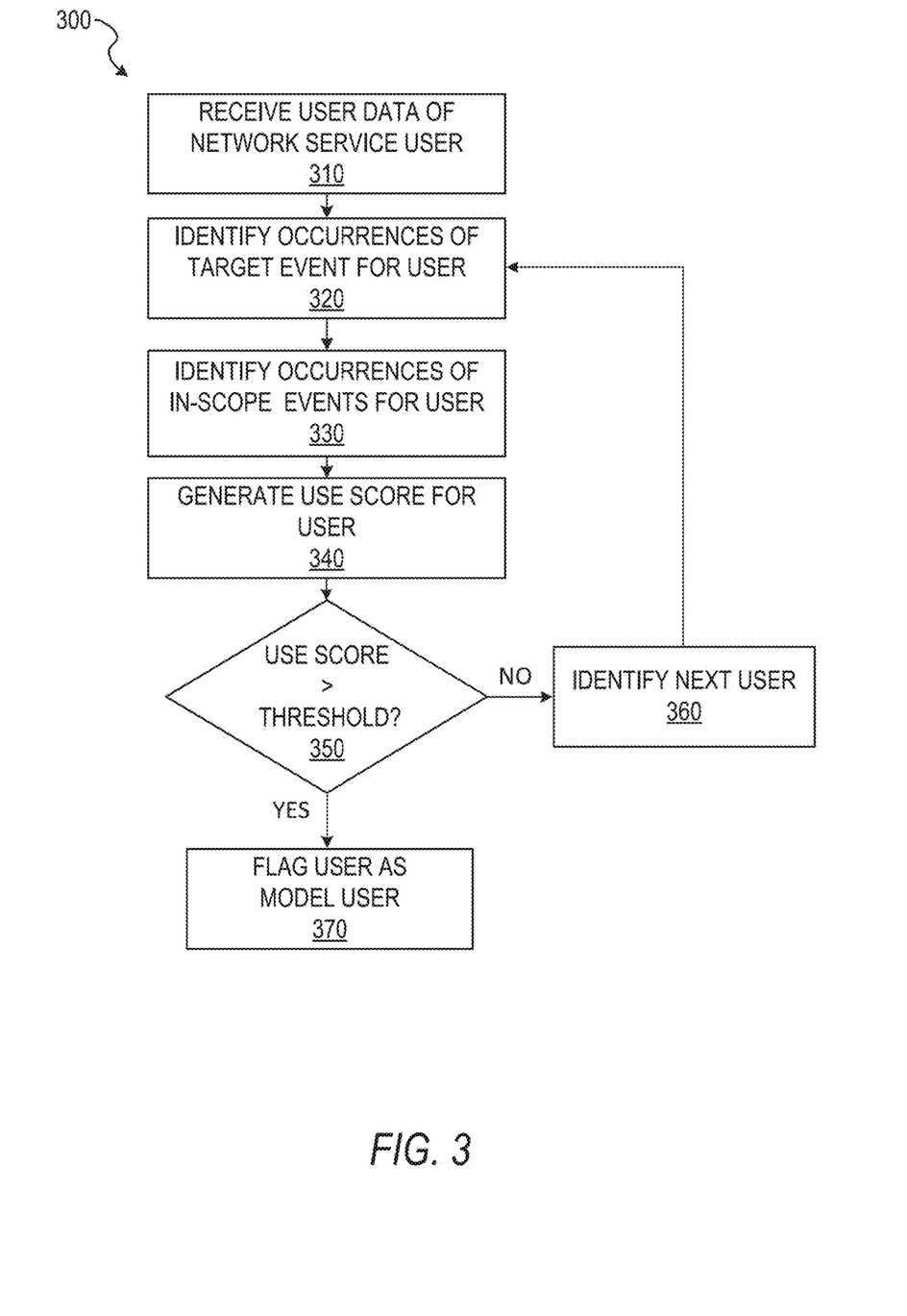
FIG. 3 is a flow diagram illustrating an example method for identifying model users of a network service, according to some example embodiments.

FIG. 3 is a flow diagram illustrating an example method 300 for identifying users as model users of a network service, according to some example embodiments. At operation 310, user data of a user of the network service is received by the model user analyzer module 215 from the data layer interface 210. The data layer interface 210 can, for example, retrieve the profile data for the user from database 132, and then pass it to model user analyzer 215. At operation 320, the model user analyzer module 215 identifies the number of times (e.g., occurrences) a target event has occurred for the user. The number of times (e.g., quantity) the target event occurred for the user is the target event completion data. For example, assuming, strictly as an example, the network service 124 is a job candidate search engine, the user may contact a number of users of the social networking system 120 in an attempt to fill an open employment position. If one of the contacted users accepts the job for the open employment position, the event qualifies as a target event. Thus, continuing the example, at operation 320, the number of occurrences of a target event is then the number of times a contacted user takes an employment position recommended by the user (e.g., the recruiter). In some example embodiments, the model user analyzer module 215 determines the occurrences of a target event for a user by checking user profiles of the contacted job candidates to determine if they took the position recommended by the user. In some embodiments, each occurrence of a target event is input manually by the user upon the target event occurring. For example, a recruiter may keep a tally of how many target events occurred using a target event counter.

At operation 330, the model user analyzer module 215 determines how many in-scope events have occurred for the user, as according to some example embodiments. In-scope events are events that do not qualify as target events but are still highly indicative that the user is using the network service 124 well. In-scope events are categorically related to target events. As an example, a recruiter of Company_A may contact a job candidate about accepting a position at Company_A. The job candidate may be currently employed by Company_Z. If the job candidate accepts the position at Company_A, model user analyzer module 215 considers the acceptance as one occurrence of a target event. However, assume job candidate accepts a similar position at Company_B, a competitor of Company_A. Though the job candidate did not accept the position at Company_A, he/she still switched companies, which is an indication that the recruiter found a candidate that was primed to switched companies. This can mean that though the recruiter did not succeed in filling the position at Company_A, he/she is still using the network service 124 in an efficient way. Thus, according to some example embodiments, the number of job candidates that filled a position about which they were contacted corresponds to the number of target events for the user, while the number of job candidates that switch jobs but that didn't take the position about which they were contacted is the number of in-scope events.

At operation 340, a use score is generated for the user. The use score is an indicator how well the user is using the network service 124. In some example embodiments, the use score is determined by the following formula: Use Score=T/IS*(1−IS/A), where "T" is the number of target events, "IS" is the number of in-scope events, and "A" is the number of attempts to achieve a target event. For example, continuing the recruitment example, the target event is a hire event (e.g., the contacted job candidate accepted the recruiter-suggested position), the in-scope event is a job-switch event (e.g., the contacted job candidate did not accept the recruiter-suggested position, but recently switched jobs to a different company), and the attempts is the number of job candidates contacted about the job (e.g., the number of candidate users a recruiter contacted through network service 124). As an example, assume that a recruiter contacts 170 potential job candidates about joining Company_A over the last 12 months, further assume the that of the 170 contacted candidates, 3 accepted jobs at Company_A, and 18 of the 170 contacted candidates didn't accept a job at Company_A, but did accept a job at a different company. In this example, the model user analyzer module 215 calculates the use score as: $3/18*(1-18/170)=0.15$, which translates to a use score of 15%.

At operation 350, the model user analyzer module 215 determines whether the use score for the user exceeds a pre-configured use score threshold. The use score threshold may be set to different levels an interaction adjuster system administrator. For example, assume that the threshold is set to 10% and the user has a use score of 15% per the example above. Accordingly, at operation 350 the model user analyzer module 215 determines that the user's use score of 15% exceeds the threshold limit of 10%, and at operation 370 the user is flagged as model user. However, if the user's use score is below the threshold, the user is not flagged as a model user, and at operation 360 the next user is identified and the process loops for all users to be analyzed.

In some embodiments, use scores for all users of the network service 124 are calculated using the above operations 320-340, and the users having the top 5% of use scores are flagged or labeled as model users for the network service. Of the users having use scores in the top 5%, the user with the lowest use score may be used to set the threshold of operation 350. As new users are identified, their use scores can be calculated and the model user analyzer module 215 can determine whether their use score surpasses the threshold set by the lowest use score in the top 5%. It is appreciated that the percentage 5% is used merely as an example, and in some example embodiments other percentages may be used in a similar manner (e.g., top 10%, top 15%).

In some example embodiments, the use score is generated by adding the number of occurrences of a target event and the number of occurrences of in-scope events. For example, using the above example numbers: 3 target events (e.g., accepted job offers) plus 18 in-scope events (e.g., acceptances of positions at other companies), yields a use score of 21 for the example user.

Figure 4:
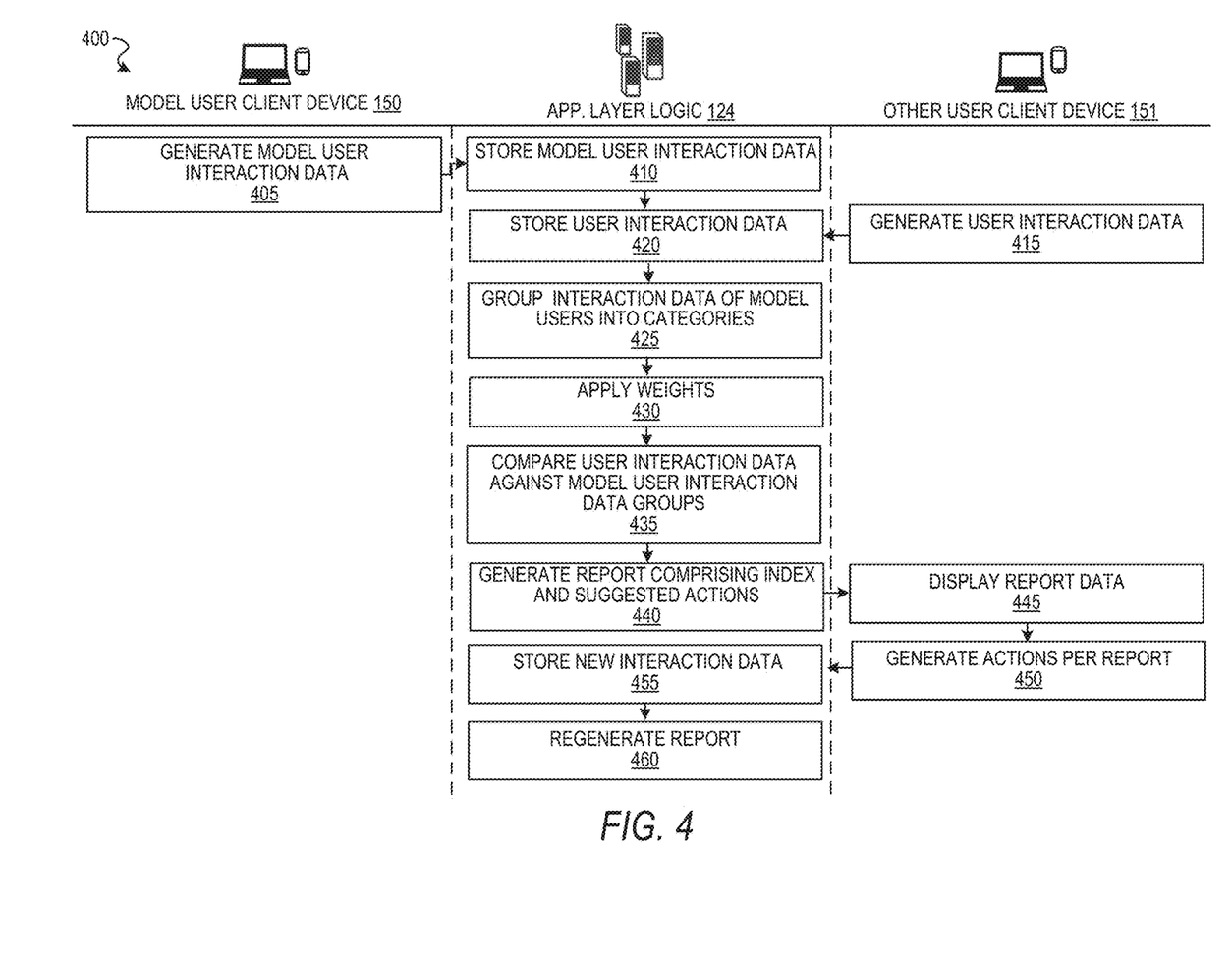
FIG. 4 is an interaction diagram illustrating an example method for comparative analysis of network service usage, according to some embodiments.

FIG. 4 shows an example interaction diagram 400 between client devices 150 and 151 and the application logic layer 144, as according to some embodiments. Once the model user analyzer module 215 identifies and flags (e.g., labels) users as model users, the users that are not assigned as model users can be compared against the model users categorically. FIG. 4 illustrates an example of the comparative processes as according to an example embodiment, where client device 150 performs operations in the left column, the application logic layer 144 performs the operations of the center column, and client device 151 performs the operations of the right column.

At operation 405, the client device 150 generates interaction data by interacting with the network service 124. At operation 410, the network service 124 stores the interaction data in database 132. At operation 415, client device 151 generates interaction data by interacting with network service 124. At operation 420, the network service stores the interaction data in database 132. Though individual client devices 150 and 151 are shown in FIG. 4, it is appreciated that according to some example embodiments the interaction data of operation 405 corresponds to all interaction data generated by the model users identified using the method of FIG. 3. Similarly, the interaction data generated at operation 415 can correspond to all interaction data generated by all users not assigned as model users (e.g., the users not identified as model users through the operations of FIG. 3).

At operation 425, the comparative interaction module 220 groups the interaction data from the model users into categories to create model categories. The categories are groups of related interactions with the network service. For example, one type of category may describe how complete a user's profile is on a network platform related to the network service. Another example type of category can describe how often and effectively a user communicates to other users through the network service, for example, through posts, e-mails, or social network interactions (e.g., likes or dislikes of another user's post, shares of a another user's post, etc.).

At operation 430, the weighting module 225 applies weights to the categories. Some categories may be considered more important in terms of achieving target and in-scope events than other categories. For example, the category describing user profile completion may not be considered as important to achieving target and in-scope events as the category that describes how often a user communicates with other users. In some embodiments, the weights are configured manually by an administrator that has analyzed what interactions most contribute towards achieving target or in-scope events. In some embodiments, the weights are assigned through machine learning that identifies what interaction data of the model users is most different than the other user interaction data.

At operation 435, interaction data from the other non-model users is compared to the interaction data of the model user to generate categorical interaction metrics. For example, assume that the average model user has a user profile that is 90-100% complete, further assume that user profile completion has a weighting of 10. At operation 435, the comparative interaction module 220 compares a non-model user having a profile completion of 95% against the 90-100% model user profile completion data to generate a profile completion comparison metric of 10 for the non-model user. The operations of 435 are discussed in greater detail below, with reference to FIG. 5. At operation 440, the report generator module 240 compiles a report comprising the interaction index and the suggested actions for the non-model user. In some example embodiments, the report generated at operation 440 is displayed in a user interface provided on the front-end layer 123 through network service 124. At operation 445, client device 151 displays the report generated by the report generator module 240. At operation 450, the client device 151 generates new interaction data per the suggestions in the report. For example, the non-model user 161 can read the suggestions in the report and perform the suggested interactions with the network service 124 (e.g., adding more data to a user profile to make it more complete, like more posts of other uses). At operation 455, the network service 124 stores the newly generated interaction data in database 132. At operation 460, the report generator module 240 can receive a newly generated index for the non-model user and newly generated interaction suggestions, if any, and compile a new report for the non-model user to analyze.

Figure 5:
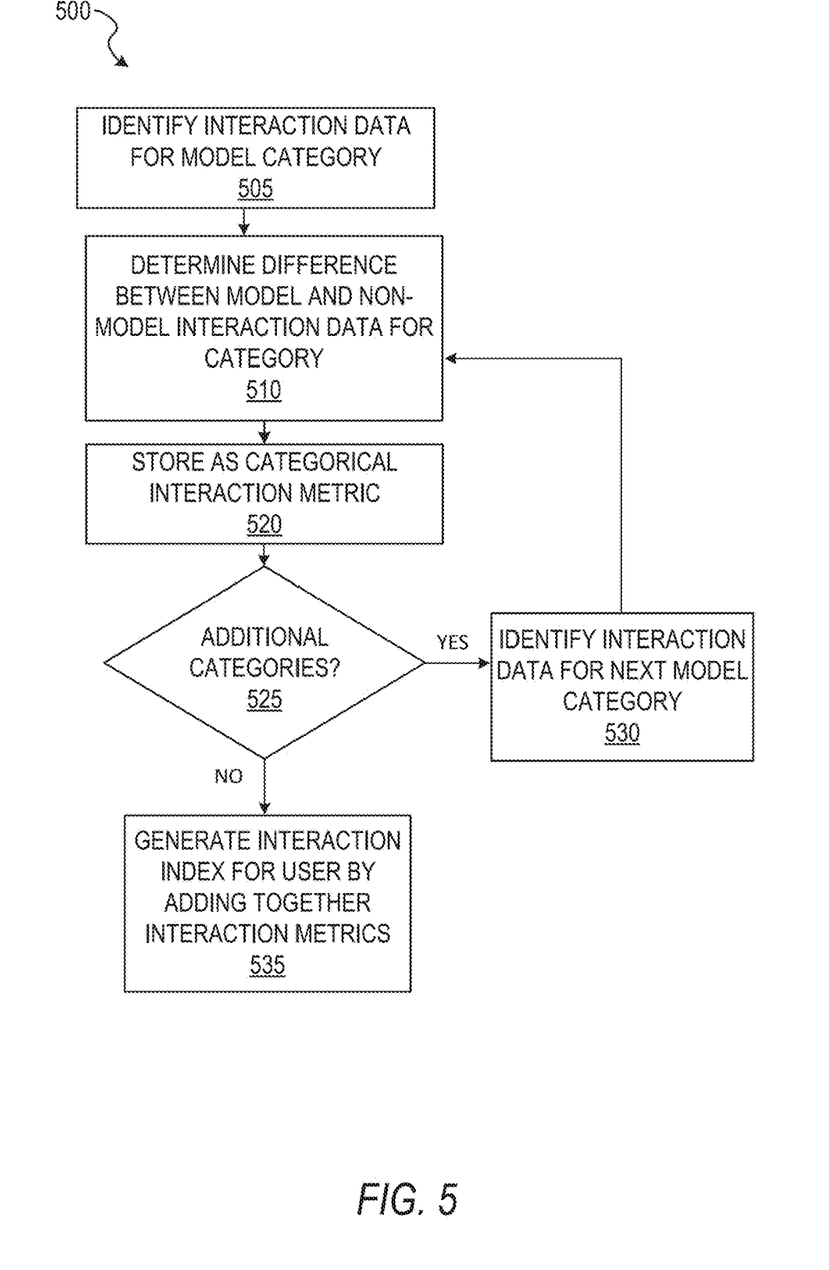
FIG. 5 is a flow diagram illustrating an example method for generating an interaction index for a user of a network service, according to some example embodiments.

FIG. 5 shows a flowchart for a method 500 for generating categorical interaction metrics for users of the network service 124, according to some example embodiments. At operation 505, the comparative interaction module 220 identifies model user interaction data for a category. At operation 510, the comparative interaction module 220 determines the difference between the model user interaction data for a category and a non-model user interaction data for the same category. In some embodiments, the model user interaction data is averaged to produce a single metric before comparing it to the non-model user's interaction data. For example, after the model users are identified, the average number of searches conducted by model users using network service 124 may be determined. The average number of searches of the model users may be set as the highest level in the weighting of a given category. For example, if the average model user (e.g., the average of all the identified model users) searches 190 times per month, searching 190 times per month may be set to 50 out of 50 possible points. Continuing the example, assume an example non-model user searches 72 times per month. Accordingly, at operation 520, the different is determined to be 190−72=118. Optionally, at operation 520, the weighting may be applied: (118/190)*50=31 points, as according to some example embodiments. It is appreciated that although a uniform distribution is used in generating the 31 points, in other example embodiments, other types of statistical distributions may be applied in the weighting (e.g., lognormal, exponential, Weibull).

At operation 520, the comparative interaction module 220 stores the difference between the two sets of interaction data as a categorical interaction metric for the non-model user. For example, the 31 points are stored as the categorical interaction metric for the search category for the non-model user. At operation 525, the comparative interaction module 220 determines whether there are additional categories to analyze to generate additional categorical metrics for the non-model user. If there are additional categories to analyze, then at operation 530 the comparative interaction module 220 identifies the interaction data of the model user and the process loops to operation 510 to determine the differences and store additional categorical interaction metrics. If there are no additional categories to analyze, then at operation 535 the interaction index generator 230 generates an interaction metric for the non-model user, for example, by adding together the one or more interaction metric stored at operation 520.

Figure 6:
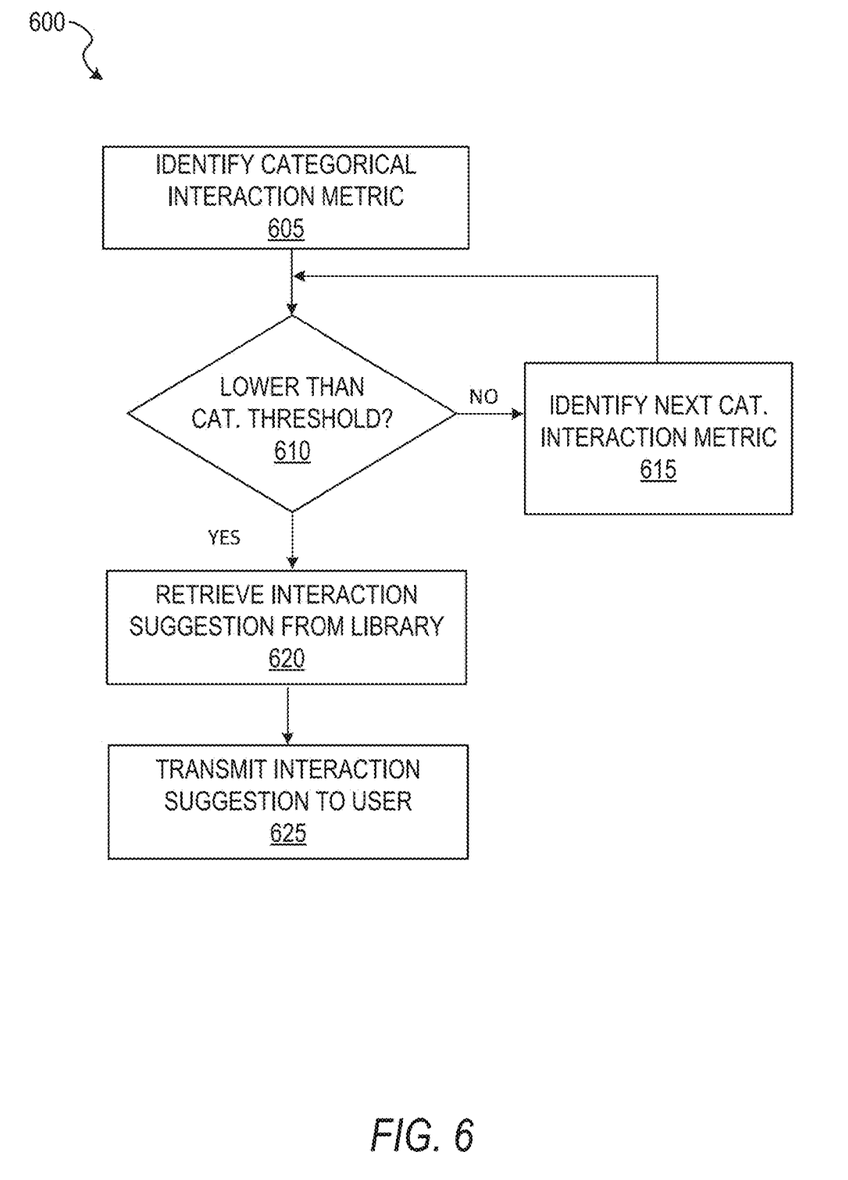
FIG. 6 is a flow diagram illustrating an example method for generating interaction suggestions for a network service, according to some example embodiments.

FIG. 6 shows a flow diagram for a method 600 of providing interaction suggestions, as according to some example embodiments. At 605, the interaction suggestion engine 235 identifies a categorical interaction metric for a non-model user. For example, continuing the example above, at operation 605 the interaction suggestion engine 235 identifies the categorical interaction metric of 31 points. At operation 610, the interaction suggestion engine 235 determines whether the categorical interaction metric is lower than a category threshold. If the categorical interaction metric is not lower than the category threshold, then at operation 615 the next categorical metric for the non-model user is identified. However, if the categorical interaction metric is lower than the category threshold, then at operation 620 the interaction suggestion engine 235 retrieves one or more suggested interactions from an interaction suggestion library and, at operation 625, transmits the interaction suggestions to the non-model user (e.g., to the client device of the non-model user for display on a graphical interface). For example, assume that the category metric for searching interactions (e.g., searches using network service 124) is 40 out of 50. In the above example, the determined categorical metric is 31, thus at operation 610, the interaction suggestion engine 235 determines that the category metric of 31 is lower than the threshold of 40. Accordingly, the interaction suggestion engine 235 can retrieve interaction suggestions at 620 and transmit them to the client device at operation 625.

In some example embodiments, the interaction suggestions retrieved can instruct the non-model user to perform more interactions of the given category (e.g., "perform more searches to boost your interaction index!"). However, directly stating what interaction to perform can enable some of the non-model users to game the system (e.g., performing random searches to boost the amount of searches performed). In some example embodiments, the interaction suggestions retrieved can instruct the non-model user to use a feature of the network service that is related to the category. For example, a user that is not performing many searches can be sent an interaction suggestion to use search filters to hone search results or the user may be sent (e.g., via the network service) a tutorial on how to use a feature of the search engine (e.g., a tutorial on "How to use the data range filter in three easy steps"). The interaction suggestions in the library can be created and tailored by an administrator of the comparative interaction adjuster system per the type of network service 124. In this way, the comparative interaction adjuster system 200 can be implemented to work with a variety of network services.

Figure 7:
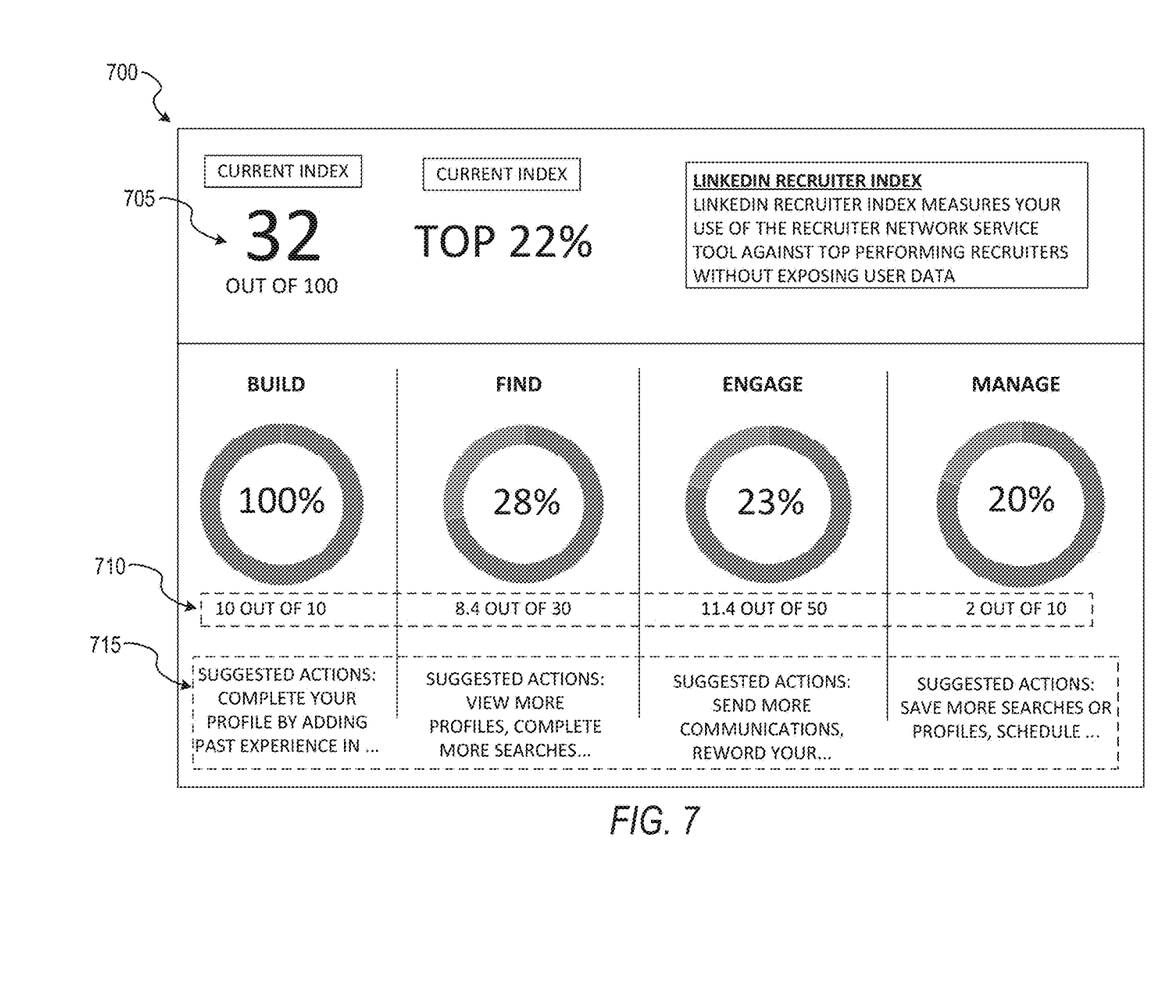
FIG. 7 is a report interface of comparative usage data for a user of a network service, according to some example embodiments.

FIG. 7 illustrates a comparative interaction report 700, according to some example embodiments. The comparative interaction report 700 is generated by the report generator module 240. The comparative interaction report 700 may be generated as a user interface supplied through the network service 124. For example, the non-model user may log into the network service 124, e.g., provide username and password to the network service 124 to authenticate a user session of the network service 124. Once logged into the network service user session, the network service 124 may display the comparative interaction report 700 generated by the report generator module 240 of comparative interaction adjuster system 200.

As illustrated, according to some example embodiments, the report may display the comparative interaction index 705 for the logged-in user. The example comparative interaction index 705 is created by adding together the four example category scores using the methods discussed above. Four categories of interaction for network service 124 are included in the comparative action report 700, including a build category (e.g., profile category), a find category (e.g., search category), an engage category (e.g., user communication category), and a manage category (e.g., organization category).

The build category describes how well the user has built his/her profile by analyzing the extent to which the user's profile is complete on network service 124. As illustrated, according to some example embodiments, the build category weight is 10.

The find category describes how well the user can identify qualified job candidates using the search and research tools of network service 124. In some example embodiments, the interactions analyzed for the find category include the quantity of days the user is logged into network service 124, the quantity of other user profiles viewed through network service 124, and the number of job candidate searches completed through network service 124. As illustrated, according to some example embodiments, the find category weight is 30.

The engage category describes how well the user communicates with potential job candidates through network service 124. In some example embodiments, the interactions analyzed for the engage category include the number of electronic messages that are sent by the user to other users through network service 124, the quantity of the sent electronic messages opened by the respective other users, the number of times other users have liked content (e.g., posts, status updates, article shares) posted by the user, the number of times the user has liked content posted by other users, the amount of comments received in content posted by the user on the social networking system 120, and the number of times the user has commented on other users' posts on the social network system 120. As illustrated, according to some example embodiments, the engage category weight is 50.

The manage category describes how well the user collaborates with other users on the network service 124 and organizes the user's data within the network service 124. In some example embodiments, the interactions analyzed for the manage category include the number of search results conducted through the network service 124 that are saved within the network service 124 by the user (e.g., saved within the profile of the user in the network service 124) and the number of user profiles of other users saved by the user. As illustrated, according to some example embodiments, the engage category weight is 10.

The comparative action report 700 further illustrates that each of the category weights 710 may be displayed to the user to help the user gauge how he/she is interacting with network service 124 on a categorical basis. Further, according to some example embodiments, the comparative action report 700 may display the interaction suggestions 715. Optionally, in some example embodiments, the interaction suggestions 715 are not included in the report but instead tutorials or other content may be sent to the user through the network service 124 messaging services, or through other electronic messaging means, such as the user's email address (e.g., private email address of the user, an email service unassociated with the network service 124).

Figure 8:
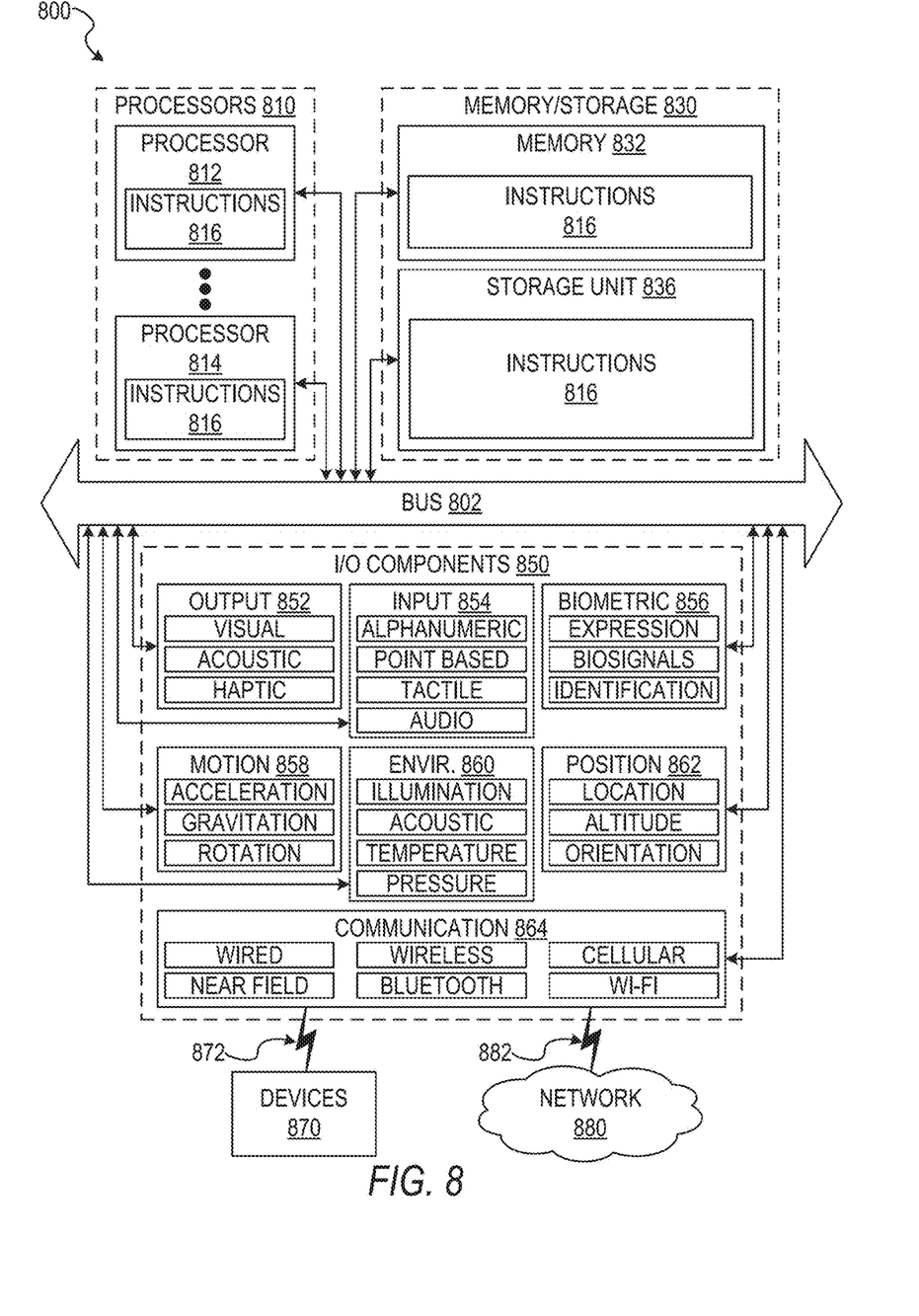
FIG. 8 illustrates a diagrammatic representation of a machine in the form of a computer system within which a set of instructions may be executed for causing the machine to perform any one or more of the methodologies discussed herein, according to an example embodiment.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein can be executed. For example, the instructions 816 can cause the machine 800 to execute the flow diagrams of FIGS. 3-6. Additionally, or alternatively, the instruction 816 can implement the data layer interface module 210, model user analyzer module 215, weighting module 225, interaction index generator 230, interaction suggestion module 235, and report generator module 240 of FIG. 2, and so forth. The instructions 816 transform the general, non-programmed machine into a particular machine programmed to carry out the described and illustrated functions in the manner described. In alternative embodiments, the machine 800 operates as a stand-alone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 can include processors 810, memory/storage 830, and I/O components 850, which can be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 812 and processor 814 that may execute instructions 816. The term "processor" is intended to include multi-core processor that may comprise two or more independent processors (sometimes referred to as "cores") that can execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory/storage 830 can include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 can also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of the processors 810 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 can include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 can include output components 852 and input components 854. The output components 852 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 850 can include biometric components 856, motion components 858, environmental components 860, or position components 862 among a wide array of other components. For example, the biometric components 856 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 can include acceleration sensor components (e.g., an accelerometer), gravitation sensor components, rotation sensor components (e.g., a gyroscope), and so forth. The environmental components 860 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or other suitable device to interface with the network 880. In further examples, communication components 864 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 870 may be another machine or any of a wide variety of peripheral devices (e.g., a peripheral device coupled via a Universal Serial Bus (USB)).

Moreover, the communication components 864 can detect identifiers or include components operable to detect identifiers. For example, the communication components 864 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 864, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or other type of cellular or wireless coupling. In this example, the coupling 882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 can be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 can be transmitted or received using a transmission medium via the coupling 872 (e.g., a peer-to-peer coupling) to devices 870. The term "transmission medium" shall be taken to include any intangible medium that is capable of storing, encoding, or carrying the instructions 816 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    generating target event data for a plurality of users of a network service, the target event data specifying a quantity of target events performed by each of the plurality of users, wherein each target event corresponds to a user of the plurality of users recommending an employment position to a member of the network service and the member being hired for the recommended employment position;
    identifying a portion of the plurality of the users as model users of the network service based on calculating a score for each of the plurality of users using the target event data for the respective user, in-scope events for the respective user, and a total number of attempts by the respective user, wherein in-scope events correspond to the respective user of the plurality of users recommending an employment position to a member of the network service and the member being hired for an employment position different from the recommended employment position, and wherein attempts correspond to the respective user of the plurality of users recommending an employment position to a member of the network service;
    grouping interaction data of the model users into model categories, the interaction data describing network interactions with the network service by the model users;
    generating categorical interaction metrics for the plurality of users by comparing interaction data of the plurality of users against the interaction data in the model categories; and
    transmitting interaction suggestions to users of the plurality of users that have categorical interaction metrics lower than a category threshold.

2. The method of claim 1, wherein the plurality of users access the network service through a public frontend interface provided by the network service, and access to the interaction data through the public frontend interface is restricted.

3. The method of claim 1, comprising:
    weighting the categorical interaction metrics for each of the plurality of users;
    generating an interaction index number for each of the plurality of users by summing the categorical interaction metrics of a respective user of the plurality of users; and
    transmitting the interaction index numbers to corresponding users.

4. The method of claim 1, wherein the model users are identified based on their corresponding score exceeding a threshold.

5. The method of claim 1, wherein a quantity of in-scope events are used to offset the quantity of target events.

6. The method of claim 1, wherein the model categories comprise:
    a profile category that describes completeness of a user profile on the network service,
    a search category that describes search interactions a user has conducted on the network service,
    a user communication category that describes how many electronic communications a given user has initiated with other users of the network service, and
    an organization category that describes occurrences of saved interactions with the network service.

7. The method of claim 6, wherein the comparing the interaction data of the plurality of users against the interaction data in the model categories comprises assessing a similarity between the interaction data of the plurality of users and the interaction data in the model categories.

8. The method of claim 1, wherein the interaction suggestions are retrieved from an interaction suggestion library comprising:
    a suggestion to add more user data to a user profile,
    a suggestion to perform more searches through the network service,
    a suggestion to view more user profiles through the network service,
    a suggestion to send more electronic communications to users through the network service,
    a suggestion to change a subject line or content of electronic communications,
    a suggestion to save more search results of searches conducted on the network service, and
    a suggestion to save more user profiles on the network service.

9. A system comprising:
    one or more processors of a machine; and
    a memory storing instructions that, when executed by the one or more processors, cause the machine to perform operations comprising:
        generate target event data for a plurality of users of a network service, the target event data for a plurality of users of a network service, the target event data specifying a quantity of target events performed by each of the plurality of users, wherein each target event corresponds to a user of the plurality of users recommending an employment position to a member of the network service and the member being hired for the recommended employment position;
        identify a portion of the plurality of the users as model users of the network service based on calculating a score for each of the plurality of users using the target event data for the respective user, in-scope events for the respective user, and a total number of attempts by the respective user, wherein in-scope events correspond to the respective user of the plurality of users recommending an employment position to a member of the network service and the member being hired for an employment position different from the recommended employment position, and wherein attempts correspond to the respective user of the plurality of users recommending an employment position to a member of the network service;

group interaction data of the model users into model categories, the interaction data describing network interactions with the network service by the model users;

generate categorical interaction metrics for the plurality of users by comparing interaction data of the plurality of users against the interaction data in the model categories; and transmit interaction suggestions to users of the plurality of users that have categorical interaction metrics lower than a category threshold.

10. The system of claim 9, wherein the plurality of users access the network service through a public frontend interface provided by the network service, and access to the interaction data through the public frontend interface is restricted.

11. The system of claim 9, wherein the instructions, when executed by the one or more processors, further cause the machine to perform operations comprising:

weight the categorical interaction metrics for each of the plurality of users;

generate an interaction index number for each of the plurality of users by summing the categorical interaction metrics of a respective user of the plurality of users; and transmit the interaction index numbers to corresponding users.

12. The system of claim 9, wherein the model users are identified based on their corresponding score exceeding a threshold.

13. The system of claim 9, wherein a quantity of in-scope events are used to offset the quantity of target events.

14. The system of claim 9, wherein the model categories comprise:

a profile category that describes completeness of a user profile on the network service, a search category that describes search interactions a user has conducted on the network service, a user communication category that describes how many electronic communications a given user has initiated with other users of the network service, and an organization category that describes occurrences of saved interactions with the network service.

15. The system of claim 14, wherein the comparing the interaction data of the plurality of users against the interaction data in the model categories comprises assessing a similarity between the interaction data of the plurality of users and the interaction data in the model categories.

16. The system of claim 9, wherein the interaction suggestions are retrieved from an interaction suggestion library comprising:

a suggestion to add more user data to a user profile, a suggestion to perform more searches through the network service, a suggestion to view more user profiles through the network service, a suggestion to send more electronic communications to users through the network service, a suggestion to change a subject line or content of electronic communications, a suggestion to save more search results of searches conducted on the network service, a suggestion to save more user profiles on the network service.

17. A non-transitory machine-readable storage medium embodying instructions that, when executed by a machine, cause the machine to perform operations comprising:

generate target event data for a plurality of users of a network service, the target event data specifying a quantity of target events performed by each of the plurality of users, wherein each target event corresponds to a user of the plurality of users recommending an employment position to a member of the network service and the member being hired for the recommended employment position;

identify a portion of the plurality of the users as model users of the network service based on calculating a score for each of the plurality of users using the target event data for the respective user, in-scope events for the respective user, and a total number of attempts by the respective user, wherein in-scope events correspond to the respective user of the plurality of users recommending an employment position to a member of the network service and the member being hired for an employment position different from the recommended employment position, and wherein attempts correspond to the respective user of the plurality of users recommending an employment position to a member of the network service;

group interaction data of the model users into model categories, the interaction data describing network interactions with the network service by the model users;

generate categorical interaction metrics for the plurality of users by comparing interaction data of the plurality of users against the interaction data in the model categories; and transmit interaction suggestions to users of the plurality of users that have categorical interaction metrics lower than a category threshold.

18. The non-transitory computer-readable storage medium of claim 17, wherein the plurality of users access the network service through a public frontend interface provided by the network service, and access to the interaction data through the public frontend interface is restricted.

* * * * *